United States Patent

[11] 3,573,357

[72] Inventor Francis G. Toce
Syracuse, N.Y.
[21] Appl. No. 723,741
[22] Filed Apr. 24, 1968
[45] Patented Apr. 6, 1971
[73] Assignee General Electric Company

[54] SKIP-FIELD RECORDER WITH ELECTRONICALLY CONTROLLED STOP ACTION CAPABILITY
3 Claims, 8 Drawing Figs.

[52] U.S. Cl. .......... 178/6.6
[51] Int. Cl. .......... H04m 1/22, H04m 5/78
[50] Field of Search .......... 178/6.6 (A), 6.6 (FSS); 179/100.2 (T), 100.2 (S)

[56] References Cited

UNITED STATES PATENTS 3,327,053 6/1967 Arimura et al. .......... 179/100.2
3,431,353 3/1969 Kihara et al. .......... 178/6.6
3,470,316 9/1969 Kihara .......... 179/100.2

*Primary Examiner*—Bernard Konick
*Assistant Examiner*—Robert S. Tupper
*Attorneys*—Marvin Snyder, W. J. Shanley, Jr, Thomas A. Briody, Frank L. Neuhauser and Oscar B. Waddell

ABSTRACT: A system for providing from a helical scan skip-field magnetic tape recorder composite video having iterative portions corresponding to a single frame to enable such frames to be displayed as stable still pictures on a monitor. With the magnetic tape stationary, the video signals developed from a pair of heads spaced apart by 180° plus the arc corresponding to linear tape travel in the time of one field are combined and every other sync pulse is advanced in relation to the video signal such that corresponding portions of video in successive identical fields is in the same time relationship to its synchronizing pulse.

INVENTOR:
FRANCIS G. TOCE,
BY Julius J. Zaskalicky
HIS ATTORNEY.

INVENTOR:
FRANCIS G. TOCE,
BY Julius J. Zaskalicky
HIS ATTORNEY.

INVENTOR:
FRANCIS G. TOCE,
BY [signature]
HIS ATTORNEY.

INVENTOR:
FRANCIS G. TOCE,
BY [signature]
HIS ATTORNEY.

INVENTOR:
FRANCIS G. TOCE,

BY Julius J. Zaskalicky
HIS ATTORNEY

SKIP-FIELD RECORDER WITH ELECTRONICALLY CONTROLLED STOP ACTION CAPABILITY

BACKGROUND OF THE INVENTION

Helical scan, skip-field, magnetic tape recorders are commonly used for recording and reproducing video signals. Such recorders include a supply reel, a takeup reel and a cylindrical video head drum located between the supply and takeup reels. A rotor is provided within the video head drum on an axis colinear with the axis of the drum with a pair of video heads spaced apart by 180° plus the arc corresponding to linear tape travel in the time of one field for reasons to be explained below. A slot is provided in the video head drum in the vicinity of the heads to enable the heads to scan the tape. Magnetic tape is threaded from the supply reel, around the video head drum in substantially a half helix and then onto the takeup reel.

In operation, the tape is moved at a relatively slow rate along the drum and the rotor is rotated at a relatively fast rate. The rates are correlated so that each head is successively in operative relationship with the tape for a time corresponding to a field of video signal. One video head only is used during a recording operation and accordingly only every other field of video signal is recorded. On playback, both heads are used. Each head scan the same track in succession to produce two identical fields of video. With such an arrangement, tape consumption is cut in half at the expense of some loss in resolution.

To obtain identical video signals from each of two heads in successive scans of the same track, it is necessary to lag the angular disposition of the second head in respect to a diametrically opposite position of the first head by a small amount so that the second head starts at the beginning of the track scanned by the first head. By the time the first head has scanned a track, the tape has advanced in the longitudinal direction. Accordingly, were the second head located 180° from the first head, it would have started at a point within rather than at the beginning of the track, In conjunction with a lag arrangement in the location of the pickup head, the tape is wrapped around the drum in a manner to extend slightly beyond a point on the drum 180° from its entry point to the drum so that the second head location coincides with the beginning of the track. However, when it is desired to obtain a still picture or "stop action" of a frame of video by stopping the lateral motion of the tape, the video signal obtained has an iterative portion consisting of two fields, one scanned by one head and the other scanned by the second head, which are not identical and such video signal produces an unstable picture on a display device.

The reason for the lack of time correspondence of video signals pickup by the heads will be apparent from the following explanation. Assume that the first head scans the track properly. As the second head is displaced from a position which is diametrically opposite the first head in the direction opposite to the direction of motion of the head, the second head does not initiate its scan at the identical portion of the track after the elapse of the time of one field but rather at a time slightly longer. Accordingly, the video signals of the second field in relationship to the occurrence of the periodically recurring synchronization pulses are not in the same time relationship. Consequently, such a video signal when displayed on a monitor would produce jitter action in which the display would oscillate between the display of one field and the other. The affect would be the appearance of a vertical jitter in the picture.

The present invention is directed to the provision of simple modifications of helical scan skip-field magnetic tape recorders for enabling such recorder to develop video signals which will produce stable stop action pictures.

SUMMARY OF THE INVENTION

In accordance with an exemplary embodiment of the present invention there is provided a pulse train of vertical synchronizing pulses recurring at regular intervals. From such a pulse train another pulse train is developed in which every other pulse is delayed in occurrence in relation to its normal time of occurrence by a time equal to the time the second or lagging head takes to be in position to scan the beginning of a track. Such a derived pulse train is then added to the video from the rotating video heads in the proper time position to produce a composite video, in which the video in each field of a still frame is in proper relation to the vertical synchronizing pulse of that field. In accordance with the present invention such result may be accomplished either by electrical circuit means or by electromechanical pulse generation means.

The novel features believed characteristic of the invention are set forth in the appended claims. The invention itself, together with further objects and advantages thereof, may best be understood by reference to the following description taken in connection with the accompanying drawings in which:

Figure 1:
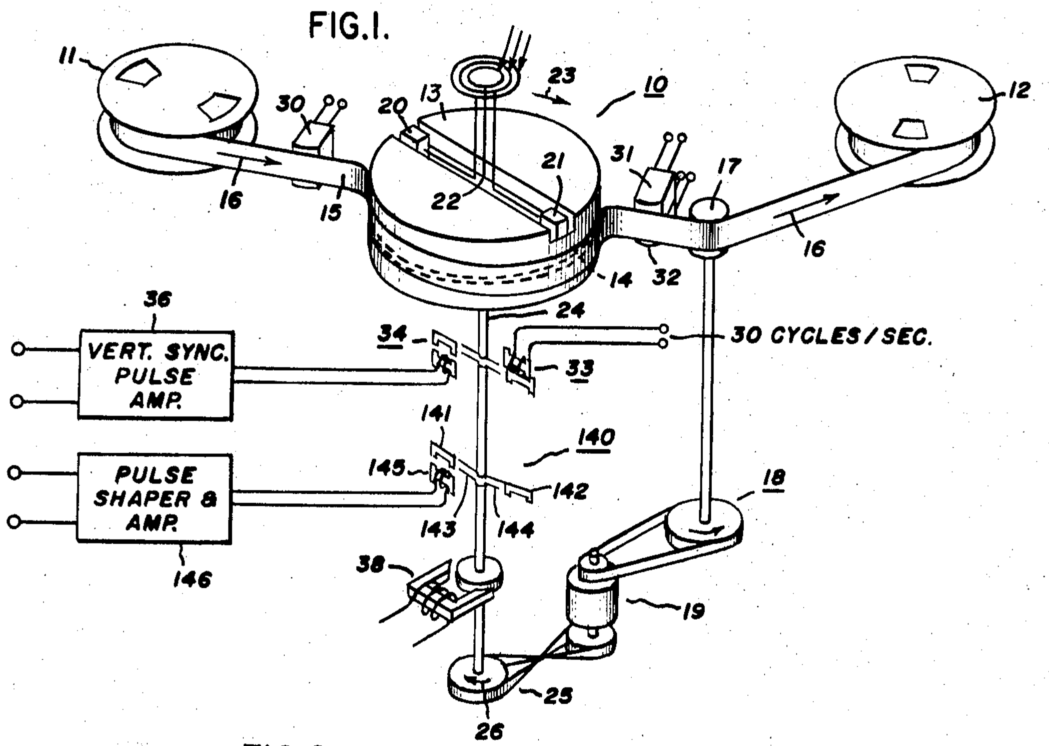
FIG. 1 is a schematic diagram in perspective of the tape transport and helical scan assemblies of a magnetic tape recorder and reproducer along with means for generating pulses of appropriate frequency for use therein.

Referring now to FIG. 1, there is shown a schematic diagram in perspective of the tape transport and the helical scan mechanism 10 of a skip field helical scan video magnetic tape record and playback apparatus. In this FIG., there is shown a supply reel 11 and a takeup reel 12 between which is located a cylindrical video head drum 13 having a slot 14 circumferentially oriented in the surface thereof. Tape 13 is threaded from the supply reel 11 through a series of tape guides (not shown) about the video head drum 13 in a half helix, that is, a helix that extends for substantially 180° about the cylinder, and, on to the takeup reel 12 in the direction indicated by arrows 16. As the tape 15 extends across the drum in a half helix the slot 14 is obliquely oriented with respect to the tape.

The tape 15 is drawn across the tape guide drum 13 by means of a drive capstan 17 which is connected through a pulley and belt arrangement 18 to the drive motor 19. On forward drive, a pinch roller (not shown) is caused to engage the tape 15 against the drive capstan 17 to produce forward drive or pull-through of the tape. Of course, it will be appreciated that various tape-tensioning mechanisms are conventionally used in connection with the supply as well as the takeup reel elements of the transport to assure proper tape tension for the recording and playback functions.

A pair of heads 20 and 21 are provided on a rotor 22 having an axis colinear with the axis of the video head drum 13. The heads 20 and 21 are located approximately on opposite sides of the rotor 22, that is, displaced approximately 180° apart, one from the other, and placed so that the rotation indicated by arrow 23 of the rotor causes the heads to pass in the vicinity of the slot and, thus, to trace out an oblique or skew path with respect to the longitudinal dimension of the tape 15. The rotor 22 is connected to the shaft 24 which, by means of a pulley and belt arrangement 25, is driven in the appropriate direction, as shown by arrow 26 by the drive motor 19. The rotation of the rotor 22 is arranged such that for each scan of a head over the tape, the time elapsed corresponds to the time of one field. One head is used on recording and two heads are used on playback.

In recorders for use in television systems, having a field repetition rate of one-sixtieth of a second, the heads rotate at 1800 revolutions per minute or 30 revolutions per second. The movement of the tape in the longitudinal direction is at a slow rate, for example, 7½inches per second. Accordingly, a field of the television signal applied to a single head would be recorded on a single track on the tape and only every other field of video would be recorded. On playback, each of the two heads scans the same track in succession to produce a video signal in which two successive fields are identical. As the field rate is one-sixtieth of a second, objectionable flicker does not appear in the image reproduced from the video signal. The advantage of the skip-field recorder such as described is that tape usage is cut in half as only information in every other field is recorded. The image reproduced from such a recording has less resolution that a recording which included the information in every field.

To obtain video signals from each of the two heads in successive scans of the same track, it is necessary to lag the angular disposition of the second head in respect to a diametrically opposite position of the first head by a small amount so that the second head starts at the beginning of the track scanned by the first head. By the time the first head has scanned a track the tape has advanced in the longitudinal direction. Accordingly, were the second head located 180° from the first head, it would have started at a point within rather than at the beginning of the track. In conjunction with the lag arrangement in the location of the pickup head, the tape is wrapped around the drum an extent slightly beyond 180° so that the second head location coincides with the beginning of the track.

Also provided on the supply side of the tape guide drum 13 is an erasing head 30 to which an electrical signal of supersonic frequency, for example 80,000 kilocycles, is supplied to erase any signal recorded on the tape and prepare it for recording of video and other signals. On the takeup side of the tape guide drum 13 is located an assembly including an audio recording and playback head 31 and a control pulse recording and playback head 32. To the audio head 31 the audio signals are applied in a conventional manner. In the video recording process, 30 cycle control pulses are applied to the control head 32 and, in the video playback process, 30 cycle pulses are developed in a manner to be described in connection with FIG. 8. Such pulses are used for maintaining proper synchronization of the recording and pickup heads on record and playback in respect to the longitudinal motion of the tape over the drum. Such synchronization assures that on playback the pickup heads start scanning at the beginning of each track.

Also shown in FIG. 1 are electromechanical generators 33 and 34 of pulses of appropriate frequency useful in connection with the display of the video signals on a video display device. The rotors of the generators 33 and 34 are mechanically secured to the shaft 24 and aligned in position with the pickup heads 21 and 22, respectively. The particular recorder illustrated in FIG. 1 is suitable for use in connection with television systems employing standards commonly used in the United States. Accordingly a 60-cycle pulse generator 34 consisting of a rotor with two permanent magnetic members, each located diametrically opposite one another, and a pickup coil in proximity thereto, is provided. During each revolution of the rotor, two impulses of voltage are induced in the pickup coil and, as the rotation rate is 30 revolutions per second, the resultant impulse rate is 60 cycles per second. Such pulses are applied to a pulse amplifier 36. The 30-cycle pulse generator 33 providing pulses for synchronization of longitudinal tape motion with the rotation of the video heads consists of another coil coupled to another magnetic member disposed on the same rotor. In this arrangement, for each revolution of the magnetic member, an impulse of voltage is induced in the coil. The coil is advanced in position in relation to the direction of the rotor so that the pulses from the 30-cycle per second generator occur in a time position delayed in respect to the pulses derived from the 60-cycle per second generator.

The stator and rotor assembly designated 38 is an eddy current brake useful in conjunction with the 30-cycle pulse generator source 33 and associate circuits to be described in connection with FIG. 6 for providing braking action to the rotor 22 to maintain proper synchronization of the rotation of heads 20 and 21 with respect to the longitudinal motion of the tape 15.

Figure 2:
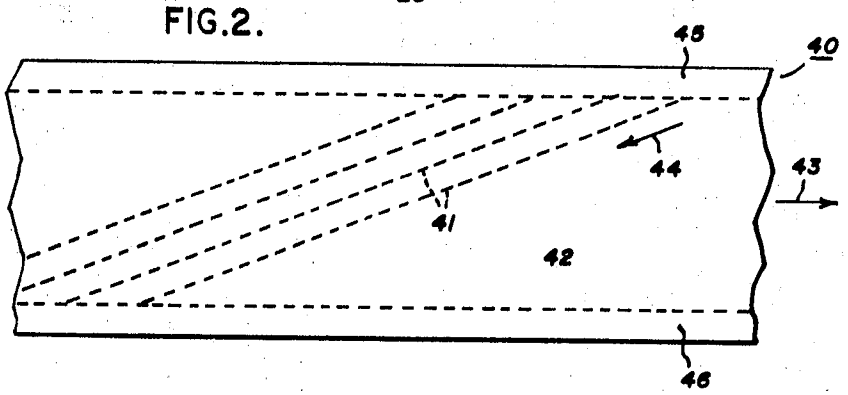
FIG. 2 is an enlarged plan view of a section of the magnetic tape of FIG. 1 showing the various recording areas thereof, the manner in which magnetic tape is moved and the video signals recorded in tracks therein.

Referring now to FIG. 2, there is shown a plan view of an enlarged section 40 of the magnetic tape 15 used in the apparatus of FIG. 1. The oblique or slant lines 41, all in parallel, appearing in the central portion 42 of the tape represents the path or track of the tape scanned by the recording head as it moves from right to left in the drawing of FIG. 1. The arrows 43 and 44 in this FIG. represent the longitudinal motion of the tape 15, and the direction of scan of the tape by a video recording heads 20 and 21, respectively. Each track represents a field of video signals. On the upper margin portion 45 of the tape, the audio signals associated with the recording are recorded by means of head 31. Along the lower margin portion 46 are recorded by head 32 the nominally 30-cycle synchronizing pulses used for synchronizing the video heads with respect to the longitudinal motion of the tape on playback.

Figure 3:
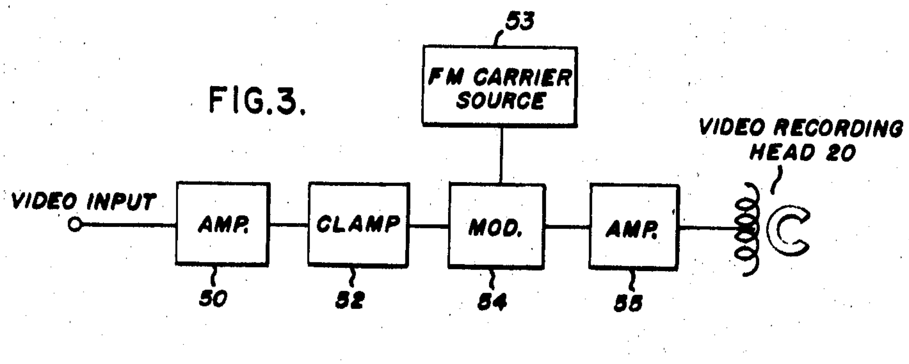
FIG. 3 is a block diagram of the electrical circuit used for processing video signals into a form for application to the video recording heads of FIG. 1.

Referring now to FIG. 3, there is shown a block diagram of a circuit for processing the video signals obtained from a television camera, or from some other source, for application to the video recording head of FIG. 1, for example head 20. The circuit includes an amplifier 50, a clamp circuit 52, a source of frequency modulation carrier 53, a modulator 54, and an amplifier 55. The video signals are applied to amplifier 50, the output of which is clamped by clamp 52 to a DC reference level corresponding to a particular carrier frequency. The carrier from source 53 is modulated in frequency by the clamped video in the modulator 54. The resultant signal is amplified and applied to the recording head 20. A frequency modulation system is commonly used in video recorders for the reason that it provides good signal to noise ratio for low frequency signals, eliminates amplitude variations on record and playback, and also eliminates the need for a bias frequency source.

Figure 4:
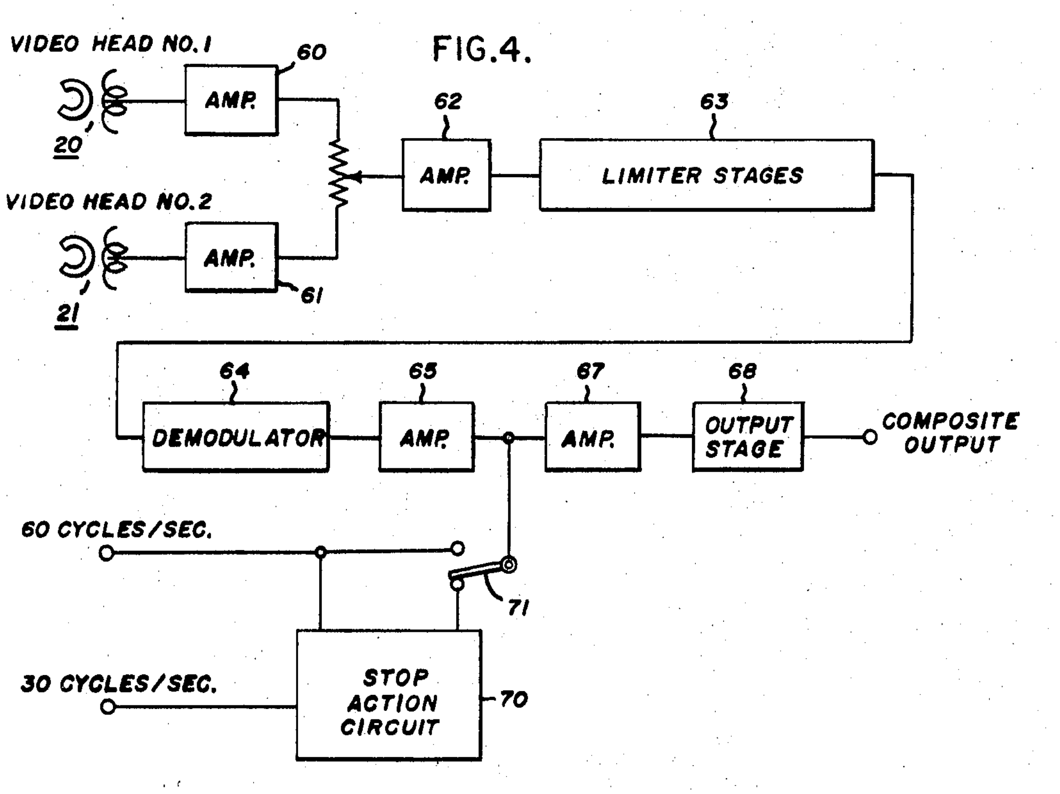
FIG. 4 is a block diagram of the electrical circuit of the recorder used for reproducing the video signals recorded on the magnetic tape both in normal playback and in stop action or still picture presentation.

Referring now to FIG. 4, there is shown a block diagram of a circuit for reproducing or playing back the video recorded on the magnetic tape in the apparatus of FIG. 1. The video signals picked up by each of the heads 20 and 21 are amplified by respective associated amplifiers 60 and 61 and combined at the input to the amplifier, 62. The frequency-modulated signal is limited in amplitude in several limiter stages 63 to eliminate all amplitude variations in the resultant signal and is then applied to a demodulator 64 which recovers the video signal on the frequency-modulated carrier. The video signal is amplified by amplifiers 65 and 67 and is then applied to an impedance-matching output stage 68. The output of stage 68 may be applied to a display device (not shown).

In order to assure positive vertical synchronization in the display device, vertical synchronizing pulses may be applied to the input of the amplifier 67 during normal operation of the recorder. Synchronizing pulses having the character indicated above may also be provided in order to assure stable operation of the monitor during stop action. Such pulses are derived from the stop action circuit 70 in response to 60-cycle per second and 30-cycle per second impulses applied thereto as will be described below in connection with FIGS. 5, 6, and 7. The output of the stop action circuit is connected to one contact of the single-pole, double-throw switch 71, the pole of which is connected to the input of amplifier 67. The other contact of the switch is connected to a source of normal synchronization pulses. If desired, the pole of the single pole double throw switch 71 may be connected directly to the display device to provide direct vertical synchronization thereto.

Figure 5:
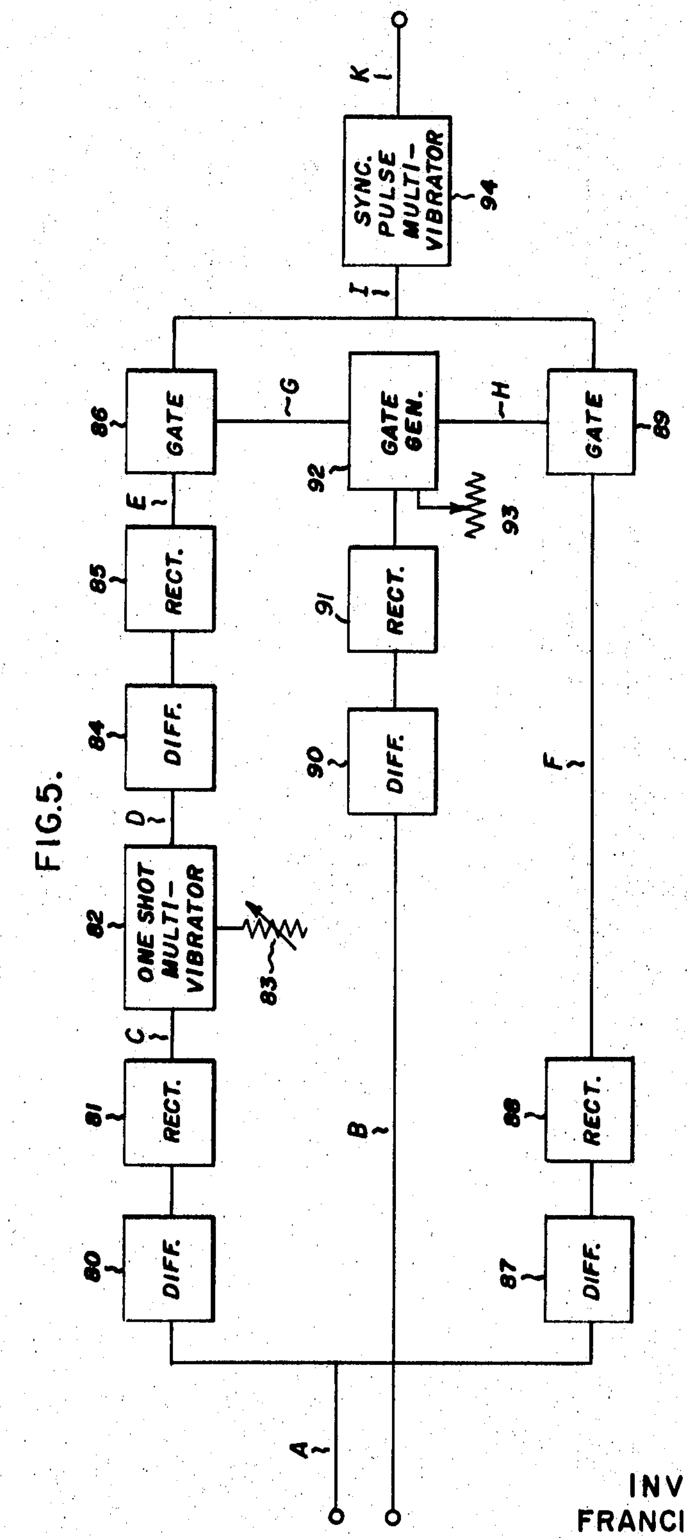
FIG. 5 is a block diagram of stop action circuit of FIG. 4 in accordance with one aspect of the present invention.

Referring now to FIG. 5, there is shown a block diagram of the stop action circuit 70 of FIG. 4. The block diagram will be described in connection with the group of waveform diagrams of FIG. 6. The abscissa of each diagram represents time and the ordinate represents amplitude. While the amplitudes of all of the diagrams are shown as identical to simplify the diagrams, it will be appreciated that in an actual circuit they would not be so. The points in the block diagram of FIG. 5 at which the literally designated waveforms of FIG. 6 occur are designated by the same letter. The waveform appearing at point A of FIG. 5 is the output of the 60-cycle pulse generator 36 of FIG. 1. The dotted pulse portion represents the desired position of the sync pulse in relation to the video scanned by the second head in order that the video information of the first and second field in stop action operation be in time correspondence. The signal represented by diagram A is differentiated by differentiator 80 and the negative pulse from the differentiator is passed by the rectifier 81 to produce a train of negative pulses such as shown in diagram C. The pulses of diagram C are utilized to trigger a one-shot multivibrator 82, the positive output pulses of which are shown in diagram D. The duration of such pulses is variable by control 83 and is so indicated by the arrow through the trailing edge of each pulse of the train. The pulses of diagram D are applied to differentiator 84 and rectifier 85, the output of which is a train of pulses such as shown in diagram E in which the negative pulses coincide with the trailing edges of the pulses of diagram D. The pulses of diagram E are applied to a gate 86. The pulses of diagram A are also differentiated and rectified in the differentiator 87 and rectifier 88 to produce another train of negative pulses as shown in diagram F. The pulses of diagram F are applied to gate 89.

The pulse train of diagram B having a nominal 30-cycle per second repetition rate is obtained from the generator 33 of FIG. 1. In this FIG., the pickup coil thereof is displaced in the direction of movement of the armature of the generator, a small lateral distance corresponding to the displacement of the first pulse of diagram B from the first pulse of diagram A. The pulse of diagram B is differentiated in differentiator 90 and the negative going pulses of the differentiated output are passed by the rectifier 91 and applied to a gate generator 92. The gate generator develops a positive going output of the form shown in diagram G and also a negative going output as shown in diagram H. The duration of the pulses of diagrams G and H from gate generator 92 is variable by means of a potentiometer 93 and is so indicated by arrows through the trailing edges thereof. The pulses of diagram G are applied to gate 86 and the pulses of diagram H are applied to the gate 89. The gate 86 passes only the pulses of the pulse train of diagram E occurring during the interval of the positive pulses thereof. The gate passes only the pulses of pulse train F occurring during the positive extending intervals of the pulses of diagram H. Accordingly, at the output of the gates 86 and 89, a train of pulses such as shown in diagram I is obtained in which the pulses have been selected from wave trains E and F, as indicated, resulting in a train of pulses in which a long interval is followed by a short interval. The pulses of pulse train I are used to trigger a one-shot multivibrator 94 which develops synchronizing pulses as indicated in diagram K. The first pulse of the train of diagram K has a leading edge coinciding with the trailing edge of the pulse of diagram A. The second pulse of the train of diagram K has a leading edge coinciding with the trailing edge of the second variable width pulse of train of diagram D and with a leading edge of the dotted pulse of diagram A which, as mentioned, is the desired pulse position to provide the desired relationship of synchronizing signal to the video of the second field picked up by the second head. Proper positioning of such pulse is controlled by the potentiometer of the one-shot delay multivibrator 82. With such an arrangement, very precise alignment in time of the video signals of the first and second head may be obtained.

Figure 6:
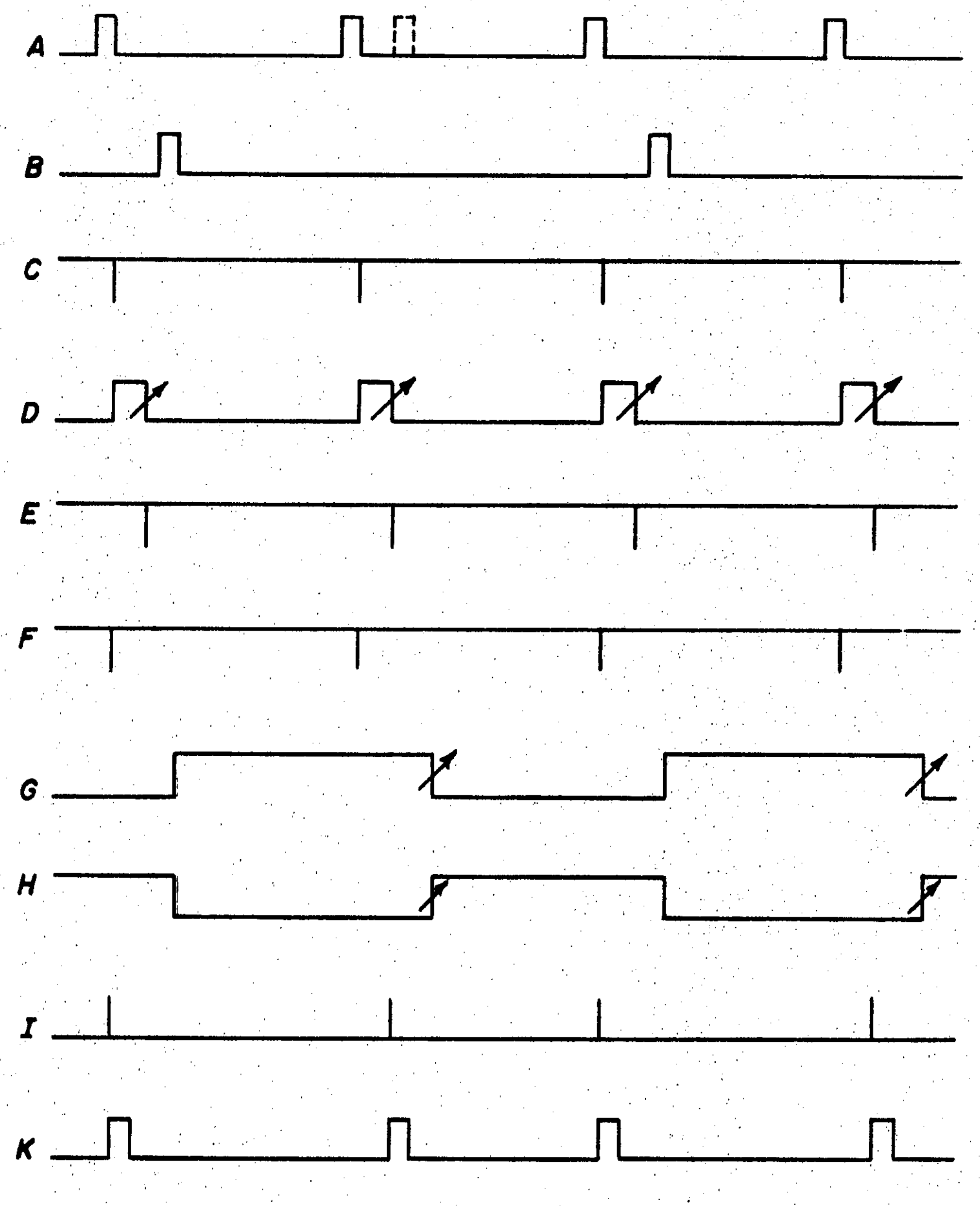
FIG. 6 is a diagram of waveforms of signals appearing at various points in the block diagram of FIG. 5.
Figure 7:
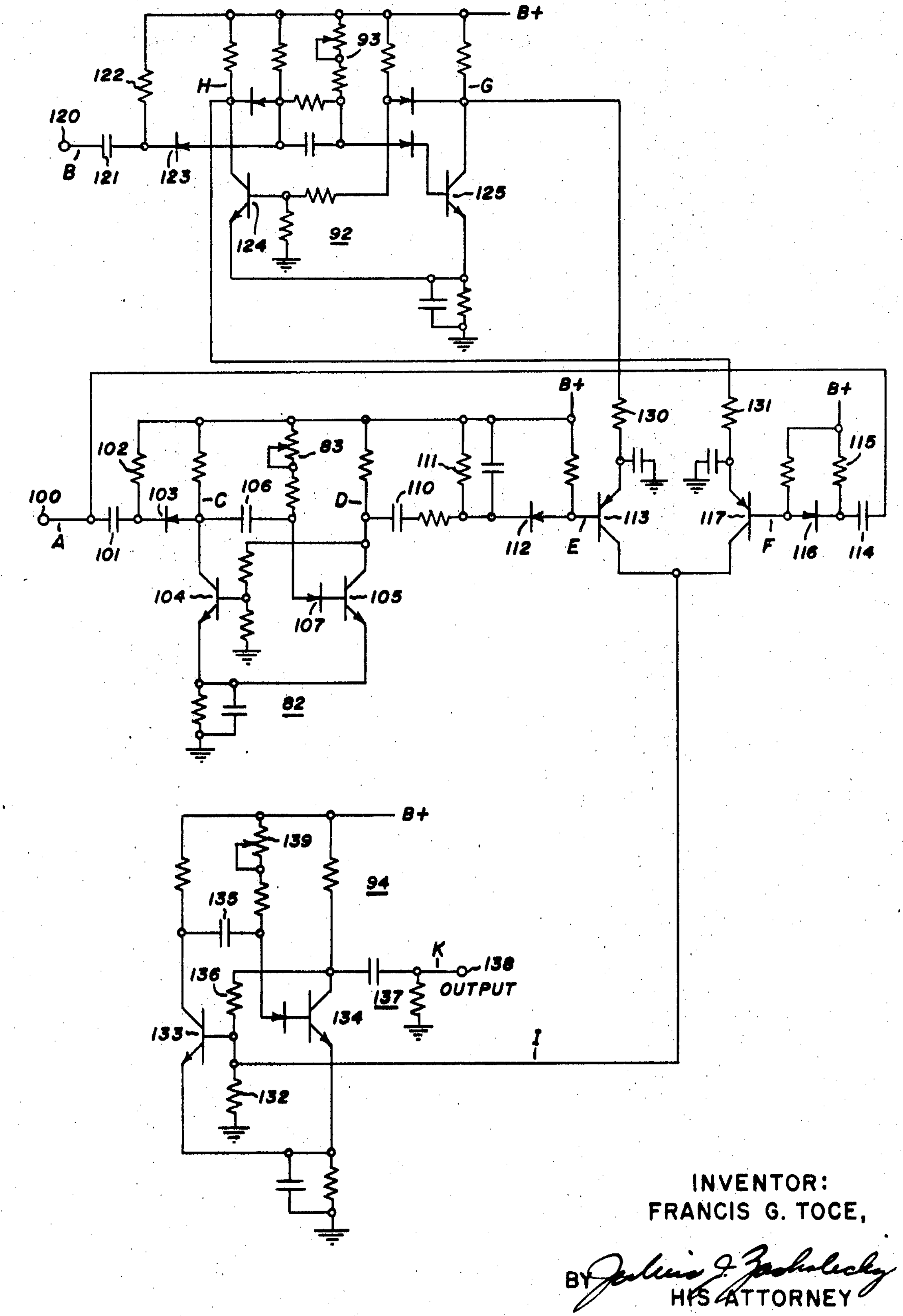
FIG. 7 is a schematic diagram of the block diagram of FIG. 5.

Referring now to FIG. 7, there is shown a schematic diagram of the block diagram of FIG. 5 which will be described in connection with the group of waveform diagrams of FIG. 6. The points in the block diagram of FIG. 5 at which the literally designated waveforms of FIG. 6 occur are designated by the same letter. The waveform A is applied at the input terminal 100, is differentiated by the network consisting of a capacitor 101 and resistor 102. The negative extending portion of the differentiated signal is rectified by the rectifier 103 to produce a signal such as shown in diagram C. Such signal is applied to the collector of NPN transistor 104 of a one-shot cathode couple multivibrator consisting of NPN transistor 104 and NPN transistor 105 an associated circuit elements. The signal of diagram C is also coupled through the capacitor 106 and through the forward biased diode 107 to the base of the transistor 105. The transistor 105 is normally conducting, as the base is connected through the diode 107 and a pair of resistances to a source of positive potential designated B+. The emitter of transistor 105 is connected through a bypassed emitter resistance to ground. Upon appearance of the pulses of diagram C, the transistor 105 is rendered nonconductive, thereby raising the potential at the base of transistor 104 and putting it into conduction. Conduction in transistor 104 lowers its collector potential and further biases transistor 105 nonconductive. The charge on the capacitor 106 gradually decays through its discharge path and, at a certain point in time, the potential at the base of the transistor 104 reaches a value which again causes transistor 105 to conduct. Conduction of transistor 105 lowers its collector potential and biases transistor 104 nonconductive. The net results of the action described is to produce pulses of the form shown in diagram D at the collector of the first transistor. By varying the time constant of the discharge circuit for the capacitor 106 by means of variable resistance 83, the duration of such pulses may be controlled.

The pulses of diagram D are also differentiated by the capacitive network consisting of capacitor 110 and resistor 111. The negative-going pulses of the differentiated signal are passed through the rectifier 112 and appear as a signal of diagram E at the base of the PNP transistor 113 which comprises a gating circuit. The pulses of diagram A also applied through the differentiating network consisting of capacitor 114 and resistor 115 and rectified by rectifier 116 to produce the negative pulses of diagram F which are applied to the base of the PNP transistor 117 which comprises a second gating circuit.

The pulses of diagram B are applied at input terminal 120 and are differentiated by the differentiating network consisting of capacitor 121 and resistor 122. The output is rectified by rectifier 123 to produce the negative going pulses which triggers a one-shot multivibrator 92 consisting of NPN transistors 124 and 125 and associated circuit elements to produce pulses of the waveform shown in diagram G at the collector of transistor 125 and of the waveform shown in diagram H at the collector of transistor 124. The one-shot multivibrator 92 is similar to the one-shot multivibrator of 82 with certain refinements to improve the waveform of the outputs.

The gating pulses G are applied through a series resistance 130 to the emitter of the gating transistor 113. The gating pulses H are applied through a series resistance 131 to the emitter of the gating transistor 117. The collectors of the PNP transistors 113 and 117 are connected in common and through a load resistance 132 to ground. In the absence of pulses G applied to gating transistor 113, the emitter is negatively biased with respect to the base thereof. Accordingly the transistor 113 is nonconductive. On appearance of the pulses G at the emitter, the transistor is rendered conductive, allowing pulses E to appear across the resistance 132 as a positive pulses corresponding to the second and fourth pulses of the waveform of diagram I. In the absence of a gating pulse at the emitter of transistor 117, the emitter base junction of the PNP transistor 117 is forward biased allowing the pulses of waveform F occurring during that interval to pass from the base to the collector circuit. On appearance of the negative going pulses of waveform H at the emitter of the transistor 117, the emitter is cut off and consequently does not allow any pulses applied to the base to pass through. Thus, it is seen that the waveform H applied to the transistor 117 allows pulses occurring at times other than the appearance of the negative going pulse thereof to pass through. Such action allows the first and third pulses of waveform F to pass through to form first and third pulses of waveform I. The pulses of waveform I are used to trigger the one-shot multivibrator 94 to form synchronizing pulses of waveform K. The one-shot multivibrator 94 is similar to the one-shot multivibrator of 82 and comprises of NPN transistor 133 and 134. Transistor 134 is normally conducting and transistor 133 is normally nonconducting. Upon the appearance of a positive pulse across the resistor 132, the emitter base junction of transistor 133 is forward biased, causing it to conduct. Through the action of coupling capacitor 135, connected between collector of transistor 133 and base of transistor 134, the transistor 134 rendered nonconductive. Transistor 134 is rendered conductive again, and transistor 133 nonconductive, after the charge on capacitor 135 has discharged sufficiently through its discharge circuit to bias the emitter base junction of the transistor 134 in the forward direction. Such action through the coupling resistance 136 causes the transistor 133 to be rendered nonconductive. Accordingly, the output pulses of the waveform shown in diagram K appear at the collector of transistor 134 and are coupled through the coupling network 137 to the output terminal 138. The duration of the pulses of waveform K may be set at various values by appropriate adjustment of variable resistor 139.

Figure 8:
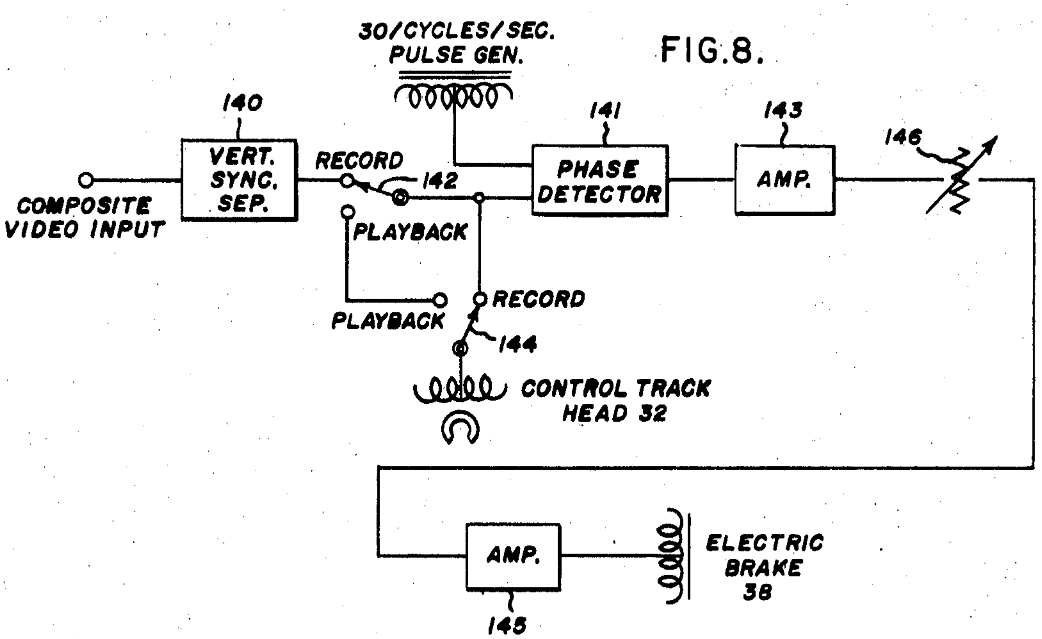
FIG. 8 is a block diagram showing the circuit which is used for maintaining proper synchronization between the longitudinal motion of the tape and the scanning motion of the record and playback heads.

The pulses of waveform K of FIG. 6 may be produced by means other than disclosed in connection with FIGS. 7 and 8. One such alternative means is shown in FIG. 1 in the form of generator 140, comprising a rotor with a pair of magnetic members 141 and 142 located on arms 143 and 144 thereof, and pickup coil 145. The arms of rotor 143 and 144 are mechanically secured to the shaft 24 and aligned with the positions of the rotor members supporting heads 20 and 21, respectively. The magnetic members 141 and 142 are located in nominally diametrically opposed positions. The arm 144 of rotor 142 corresponding to the arm of rotor member 22 supporting head 21 is angularly displaced by an angle which places the magnetic member 144 behind a position diametrically opposite to the magnetic member 143 so that the pulses generated thereby in coil 145 correspond in position to the position of the second pulse in the waveform diagram K OF FIG. 6. In the drawing the angular position of arm member 144 is exaggerated for purposes of illustration. The pulses from generator 140 are suitably shaped and amplified in pulse shaper and amplifier 146.

Referring now to FIG. 8 there is shown block diagram of a circuit for maintaining proper synchronization of the heads 20 and 21 with incoming video, when recording, and with outgoing or reproduced video, when playing back. With switch 142 and 144 in the record position, composite video is applied to the vertical synchronization separator 140 from which a vertical synchronization signal of nominally 60 cycles per second is obtained. The vertical synchronization signal, or 60-cycle per second pulse train, and a 30-cycle per second pulse train from the pulse generator 33 of FIG. 1 are applied to the phase detector 14 which compares the two signals and develops a unidirectional of DC output signal corresponding to the phase relationship of the two pulse trains. The output signal is amplified by amplifiers 143 and 145 and applied to electric brake 38. When the heads 20 and 21 depart from synchronism with respect to the input synchronization pulses, the output of amplifier 145 changes in a direction to produce the braking action required to restore synchronism. Potentiometer 146, connected between the amplifier 143 and amplifier 145, provides a fine or vernier control for synchronization. Concurrently, the vertical synchronizing signal from vertical synchronization separator 140 is applied to the control track head 32 of FIG. 1 which records control pulses on portion 46 on the tape 40 of FIG. 2. With each of switches 142 and 144 in the playback position, the recorded control pulses are reproduced from the tape and applied to the phase detector 141 in place of the vertical synchronization pulses from vertical sync separator 140. The control pulses and the 30 cycle per second reference pulses from the pulse generator 33 are compared in the phase detector 141, and a DC output signal is developed from the amplifier 145 and applied to brake 38 to maintain the rotation of the video heads 20 and 21 in synchronism with the appearance of each track of the tape 15 in the slot 14.

While the invention has been described in specific embodiments, it will be appreciated that many modifications may be made by those skilled in the art and I intend by the appended claims to cover all such modifications and changes as fall within the true spirit and scope of the invention.

I claim:

1. In a helical scan skip-field system for recording and reproducing a video signal, said system including an elongated magnetic storage medium capable of being moved in the direction of elongation thereof along a helical path about a circular drum, a pair of heads, one of said heads scanning across said medium transverse to the direction of movement of said medium so as to record every other field of the video signal in successive tracks on said medium when said system is operated in a recording mode, both of said heads scanning across said medium transverse to the direction of movement of said medium so as to play back the recorded video signal, said one of said heads being located at one end of a diameter of the circle of revolution of said heads and the other of said heads being located near the other end of said diameter displaced in a direction opposite to the direction of rotation of said heads by an arc corresponding to longitudinal displacement of the medium occurring during presentation of one field, apparatus for developing a train of vertical synchronizing pulses for use in connection with the video signal repetitively reproduced by said heads from a single one of said tracks on said medium when said medium is stationary, comprising:

- means including a first magnetic member on the arm of a rotor in alignment with said one head and moving in rotational synchronism therewith for developing a first train of pulses at one-half vertical synchronization rate, each pulse of said first train occurring at initiation of scanning of said single one of said tracks by said one of said heads;
- means including a second magnetic member on the arm of said rotor in alignment with said other head and moving in rotational synchronism therewith for developing a second train of pulses at one-half vertical synchronization rate, each pulse of said second train occurring after a predetermined delay following initiation of scanning of said track by the other of said head; and
- means including a coil adjacent said circle of revolution and responsive to said first and second magnetic members for interlacing the pulses of said first and second pulse trains into a single train of vertical synchronizing pulses.

2. In a helical scan skip-field system for recording and reproducing a video signal, said system including an elongated magnetic storage medium capable of being moved in the direction of elongation thereof along a helical path about a circular drum, a pair of heads, one of said heads scanning across said medium transverse to the direction of movement of said medium so as to record every other field of the video signal in successive tracks on said medium when said medium is operated in a recording mode, both of said heads scanning across said medium transverse to the direction of movement of said medium so as to play back the recorded video signal, said one of said heads being located at one end of a diameter of the circle of revolution of said heads and the other of said heads being located near the other end of said diameter displaced in a direction opposite to the direction of rotation of said heads by an arc corresponding to longitudinal displacement of the medium occurring during presentation of one field, apparatus for developing a train of vertical synchronizing pulses for use in connection with the video signal repetitively reproduced by said heads from s single one of said tracks on said medium when said medium is stationary, comprising:

- means responsive to rotation of said heads for deriving a first train of pulses occurring at the field rate of said video signals;
- means responsive to rotation of said heads for deriving a second train of pulses occurring at the field rate of said video signal, each pulse of said second train being delayed by a predetermined interval with respect to the respective pulses of said first train; and
- means responsive to said means for deriving said first and second pulse trains for interlacing pulses alternatively from said first and second pulse trains into a resultant train of vertical synchronizing pulses.

3. The apparatus of claim 2 in which said means for interlacing pulses alternately from said first and second pulse trains includes first and second gating means, means coupled to each of said first and second gating means for alternately rendering said first and second gating means conductive at a rate equal to the vertical synchronization rate and for sufficient duration such that each conduction interval of said first and second gating means overlaps the interval of conduction of a single pulse in said first and second pulse trains respectively, and means coupled jointly to the outputs of said first and second gating means for combining output pulses from said first and second gating means into a single pulse train.